United States Patent
Brohammer (10) Patent No.: US 7,059,064 B2
(45) Date of Patent: *Jun. 13, 2006

(54) MEASURING DEVICE (76) Inventor: Lawrence F. Brohammer, 21011 N. 123rd Dr., Sun City West, AZ (US) 85375

(*) Notice: Subject to any disclaimer, the term of this patent is extended or adjusted under 35 U.S.C. 154(b) by 0 days.

This patent is subject to a terminal disclaimer.

(21) Appl. No.: 11/075,237

(22) Filed: Mar. 8, 2005

(65) Prior Publication Data
US 2006/0000105 A1    Jan. 5, 2006

Related U.S. Application Data (63) Continuation of application No. 10/863,304, filed on Jun. 8, 2004, now Pat. No. 6,877,245.

(60) Provisional application No. 60/487,786, filed on Jul. 16, 2003.

(51) Int. Cl.
G01B 3/10 (2006.01)

(52) U.S. Cl. ............ 33/756; 33/759; 273/108; 273/118 R (58) Field of Classification Search ............ 33/755, 33/756, 759–761, 767, 770, 501.05, 501.08, 33/613, 645; 273/108, 118 R; 473/54
See application file for complete search history.

(56) References Cited

U.S. PATENT DOCUMENTS

| 1,679,178 | A | * | 7/1928 | Shillman | 33/761 |
| 2,632,952 | A | * | 3/1953 | Mallow | 33/761 |
| 4,977,684 | A | * | 12/1990 | Mosman | 33/761 |
| 5,465,962 | A | * | 11/1995 | Hiserman | 273/118 R |
| 6,754,974 | B1 | * | 6/2004 | Bassolino et al. | 33/759 |
| 2002/0073570 | A1 | * | 6/2002 | Conder | 33/755 |
| 2002/0088133 | A1 | * | 7/2002 | McMillan | 33/756 |
| 2004/0049938 | A1 | * | 3/2004 | Bassolino et al. | 33/759 |

FOREIGN PATENT DOCUMENTS

AU    B-33132/89    * 12/1990

* cited by examiner

Primary Examiner—G. Bradley Bennett
(74) Attorney, Agent, or Firm—Parsons & Goltry; Michael W. Goltry; Robert A. Parsons (57) ABSTRACT A measuring device includes a spool mounted in a housing having opposing front and rear ends. A string is wound about the spool, and has an end is attached to a marker located outside the housing. The string winds and unwinds relative to the spool upon rotation thereof. A rocker arm, which carries a first reference mark, is pivotally attached to a support attached to the housing at the front end thereof. The rocker arm carries a second reference mark, which can be aligned with the first reference mark by pivoting the rocker arm. A brake is mounted in the housing, which moves between a first position against the spool inhibiting its rotation, and a second position away from the spool permitting its rotation. The brake is biased for movement in its first position, and a handle is provided for operating the brake.

15 Claims, 6 Drawing Sheets

FIG. 6

MEASURING DEVICE

CROSS-REFERENCE TO RELATED APPLICATION

This application is a continuation of U.S. patent application Ser. No. 10,863,304, filed 08 Jun. 2004 now U.S. Pat. No. 6,877,245, which in turn claims the benefit of U.S. Provisional Patent Application Ser. No. 60/487,786, filed 16 Jul. 2003.

FIELD OF THE INVENTION

The present invention relates to apparatus and methods for measuring the distance between objects and, more particularly, to apparatus and methods for measuring the distance between a ball resting on a flat surface and a target.

BACKGROUND OF THE INVENTION

Lawn bowling is a game played on a rink within a green. There are usually eight rinks on each green. The rinks are numbered one through eight, with boundaries defined by a black stripe on each side of the rink number.

To play lawn bowling, participants roll each of their bowls as close as possible to a single small white ball called a jack or kitty. Bowls may hit the jack, but the jack must remain within the boundary markers of the rink or the end will be declared "dead." Bowls are likely to hit other bowls, and may propel them into a position that is perhaps nearer to the jack, or perhaps to a distant position outside the boundary marker line that will take them out of play.

Games are played between opposing teams of one to four players. After all members of each team have rolled a set of bowls, which marks the completion of an "end," the bowl closest to the jack counts one point for its team, and every other bowl belonging to that same team that is closer to the jack than the nearest one of the competitors' counts one additional point. Specialized measuring devices are used to measure the distances between the bowls and the jack, and a game is made up of a series of completed ends.

Bocce is a form of lawn bowling that originated in Italy. Bocce is one of the oldest of all lawn bowling games, and is becoming increasingly popular throughout the world because it can be played by people of all ages and on a great variety of surfaces. Bocce is played between teams of one to four players. Bocce is played with a target ball called a jack or pallino, and eight large bocce balls, including four of one color and four of another color. Players seek to place their bocce balls nearer to the target jack than their opponent or displace the opponent's bocce ball and so improve the position of their bocce ball in relation to the pallino. Like lawn bowling, specialized measuring devices are used to measure the distances between the bocce balls and the pallino.

Petanque is yet another form a lawn bowling that is played between teams of two or three players. Each team has six balls. A coin toss determines the starting team. A starting player from the starting team selects a starting point by marking a half-meter diameter circle. The starting player throws the target ball, known as the cochonnet or jack, at least six meters, and no more than ten meters, in any direction. A member of the starting team (usually but not necessarily the starting player) now bowls, attempting to get as close as possible to the jack. Play next passes to the players of the opposing team, who bowl until one of their balls has been placed closer to the target than the opposing team's ball or all their balls are bowled. Teams continue alternating turns until no balls remain. As in all variations of lawn bowling, only one team can score in a round—the team that has one of its balls closest to the target. That team gets a point for each ball that is closer to the target than any of the balls of the opposing team. There is a maximum of six points per round. A player can score by knocking an opponent's ball out of scoring position, or by moving the target with a shot, thereby placing it closer to his/her team's balls. If the target is knocked out of the playing area, the round must be re-started. However, if the target is knocked out by a team's last ball, the other team is awarded one point for each of its remaining balls. The team first to reach a specified number of points is the winner. As with other forms of lawn bowling, specialized measuring devices are used to measure the distances between the balls and the cochonnet.

And so in all forms of lawn bowling, special measuring devices are employed for measuring the distances between balls and targets, or jacks, and skilled artisans have devised numerous specialized measuring devices for this purpose. Although known existing measuring devices are adequate, they are difficult to construct, not entirely accurate, and expensive, thus necessitating certain new and useful improvements in the art.

SUMMARY OF THE INVENTION

The above problems and others are at least partially solved and the above objects and others realized in a measuring device for measuring a distance between a ball on a flat surface and a target, which includes a housing having opposing upper and lower ends, and opposing front and rear ends. A spool is mounted in the housing for rotation in a first direction, and a second direction, and is biased to rotate in its first direction. A string is wound about the spool, and has an end extending outwardly through the rear end of the housing, the string winding relative to the spool upon rotation thereof in the first direction, and unwinding relative to the spool upon rotation thereof in the second direction. A marker is attached to the end of the string. A support is attached to the housing, and projects forwardly of the front end of the housing. A rocker arm has opposing upper and lower ends, a first reference mark is carried by the support, and a second mark is carried by the rocker arm. The rocker arm is attached at an attachment point thereof to the support for pivotal movement between a first position of the lower end away from the front end of the housing, and a second position of the lower end toward the front end of the housing aligning the second reference mark with the first reference mark. The attachment point of the rocker arm is positioned relative to the rocker arm biasing the rocker arm in the first position of the lower end of the rocker arm. A brake is positioned in the housing, and is movable between a first position against the spool inhibiting its rotation, and a second position away from the spool permitting its rotation. The brake is biased for movement in its first position. A handle, outboard of the housing, is operatively coupled to the brake.

The spool has a hollow chamber. A coiled spring in the hollow chamber biases the spool for rotation in its first direction, in which the coiled spring has an inner end secured to a pin mounted in the housing, and an outer end secured to the spool. The pin is located at an axis of rotation of the spool, and the spool is attached for rotation to the pin.

The brake includes a fixture having an upper extremity connected to a lower extremity. The upper extremity of the brake is between the spool and the upper end of the housing, and the lower extremity of the brake is positioned between the spool and the lower end of the housing. At least one brake pad is carried by the lower extremity of the fixture facing the spool. The fixture is movable in the housing between the first position of the brake engaging the brake pad against the spool, and the second position of the brake disengaging the brake pad from the spool. At least one spring is captured by and between the lower end of the housing and the lower extremity of the fixture biasing the brake in its first position.

The handle is operatively coupled to the brake with at least one connecting pin passing through the upper end of the housing. The upper end of the housing has a length extending from the front end of the housing to the rear end of the housing. The handle has a length that is substantially equal to the length of the upper end of the housing.

The marker consists of a generally flat, elongate element having an upper end, a lower end, opposing sides, a flat inner face, and an opposing outer face. The end of the string extends into and through the flat inner face of the marker between the opposing sides thereof. The rear end of the housing has a flat outer surface extending along substantially the entire length of the housing from the upper end to the lower end. The flat inner face of the marker is drawn flat against the flat outer surface of the rear end of the housing when the string is fully wound onto the spool.

BRIEF DESCRIPTION OF THE DRAWINGS

Referring to the drawings.

DETAILED DESCRIPTION OF A PREFERRED EMBODIMENT

Figure 1A:
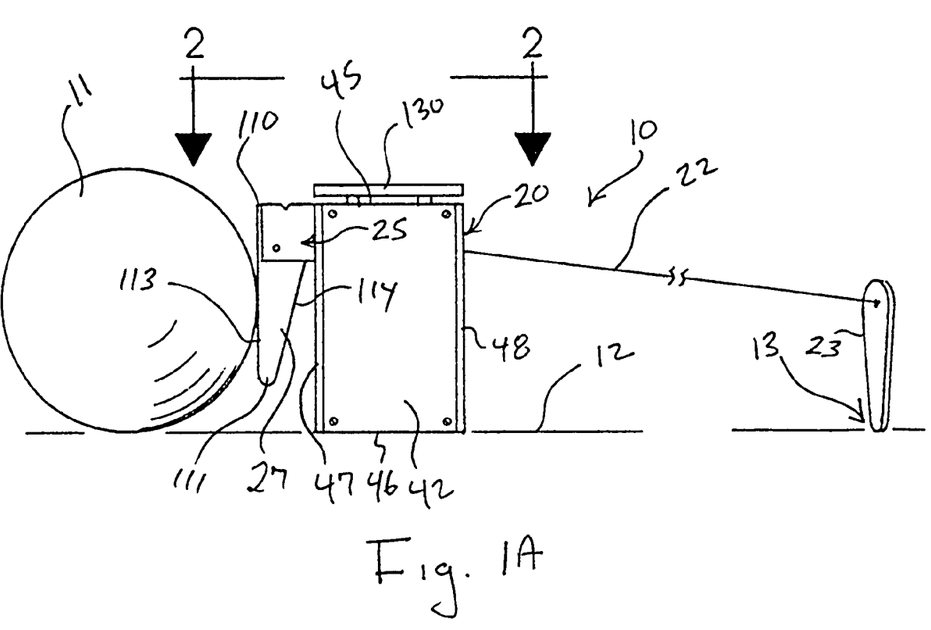
FIGS. 1A and 1B illustrate a measuring device shown as it would appear in use measuring a distance between a ball on a flat surface, and a target, the measuring device constructed and arranged in accordance with the principle of the invention.
Figures 1B, 2:
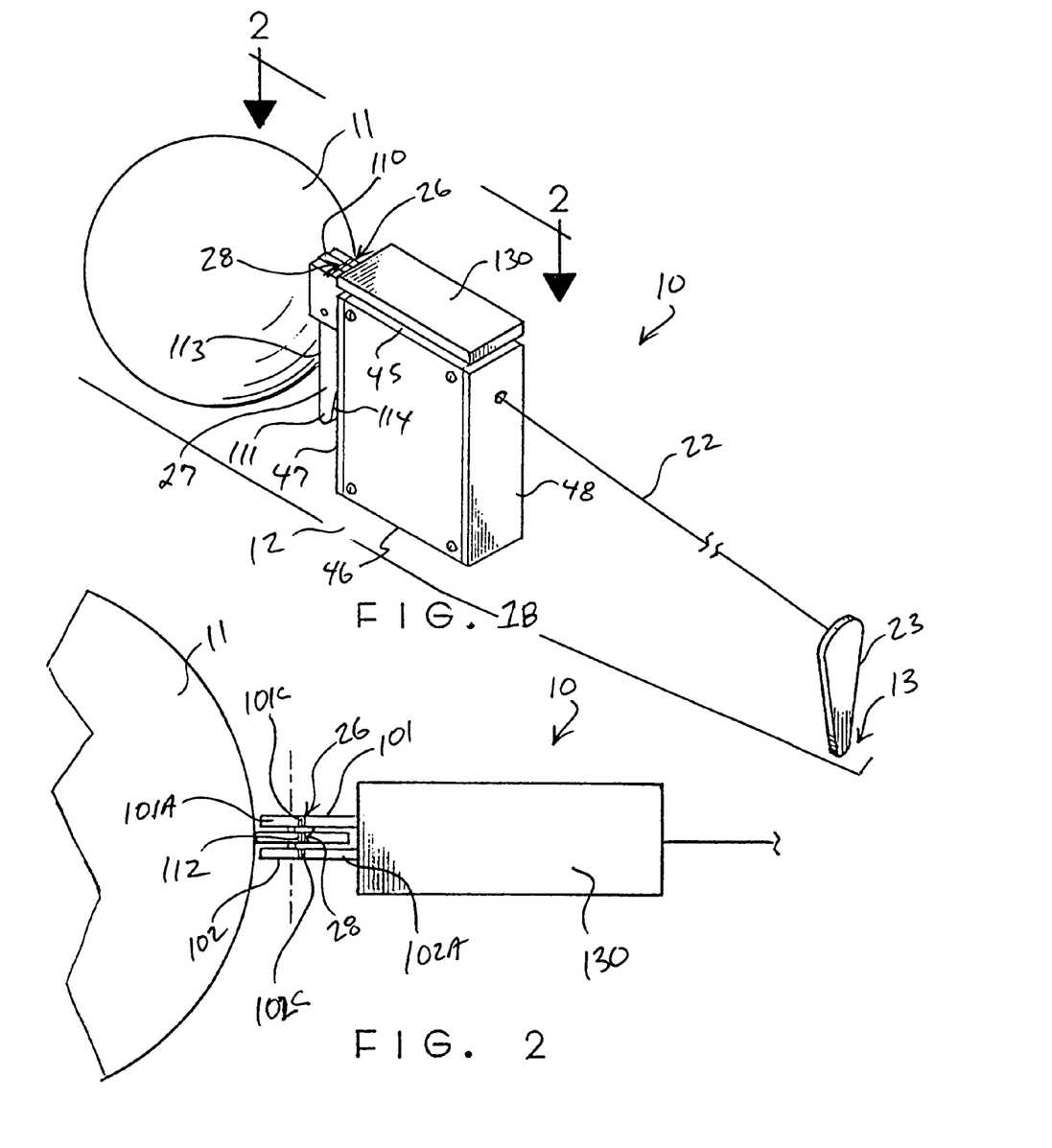
FIG. 2 is top plan view looking downwardly along line 2—2 of FIG. 1.

Turning now to the drawings, in which like reference characters indicate corresponding elements throughout the several views, attention is first directed to FIGS. 1A and 2A, in which there is seen a measuring device, embodying the principle of the instant invention, generally indicated by the reference character 10, which is configured and arranged for measuring a distance D between a ball 11 resting on a flat surface 12 and a target denoted generally at 13. In FIGS. 1A and 1B target 13 is a point on surface 12. Target 13 can also be another ball resting on surface 12. In this respect, measuring device 13 is useful in all forms of lawn bowling for measuring the distance between balls and jacks and like targets.

Figure 3A:
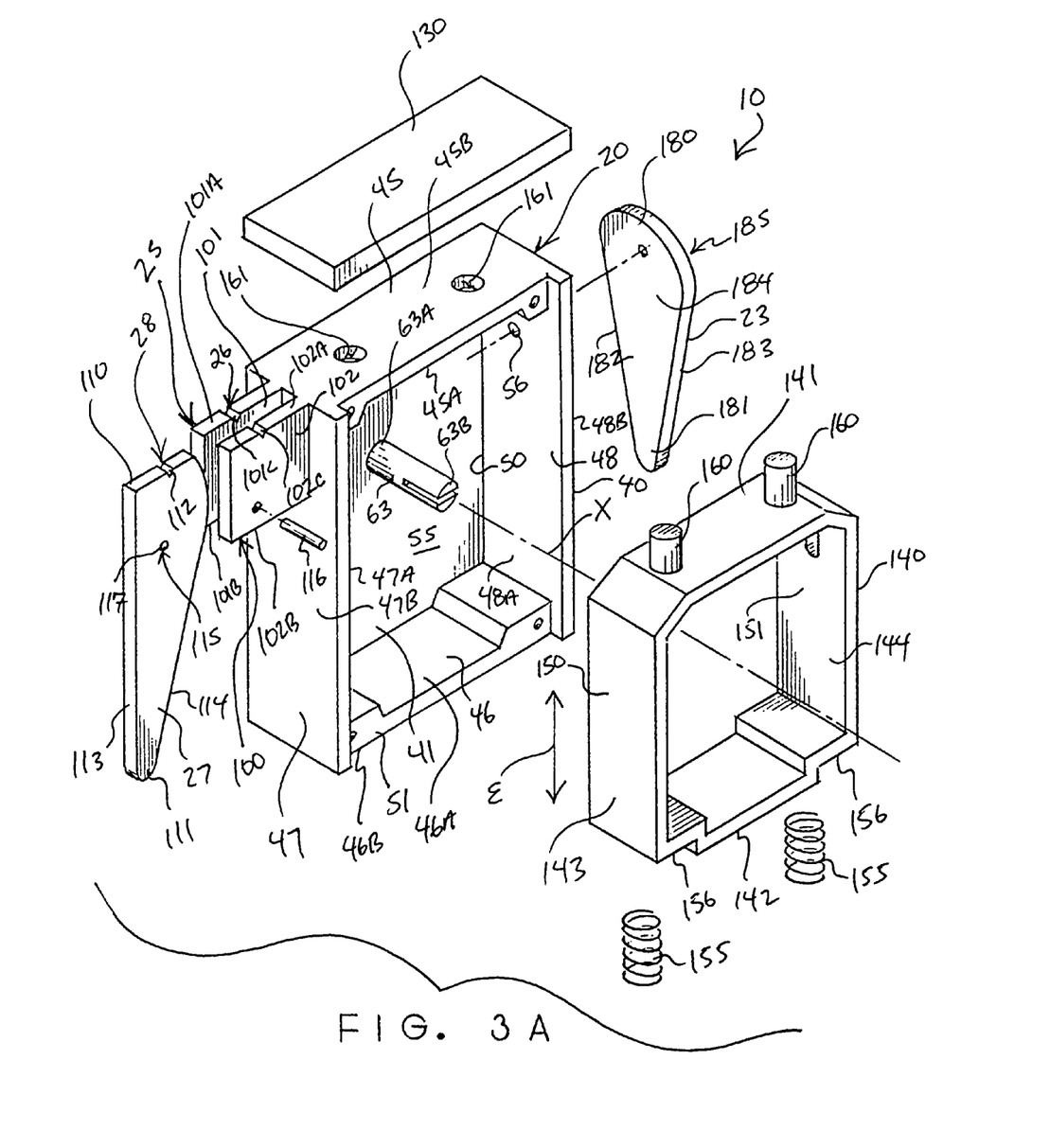
FIGS. 3A and 3B constitute an exploded isometric view of the measuring device of FIG. 1.
Figure 3B:
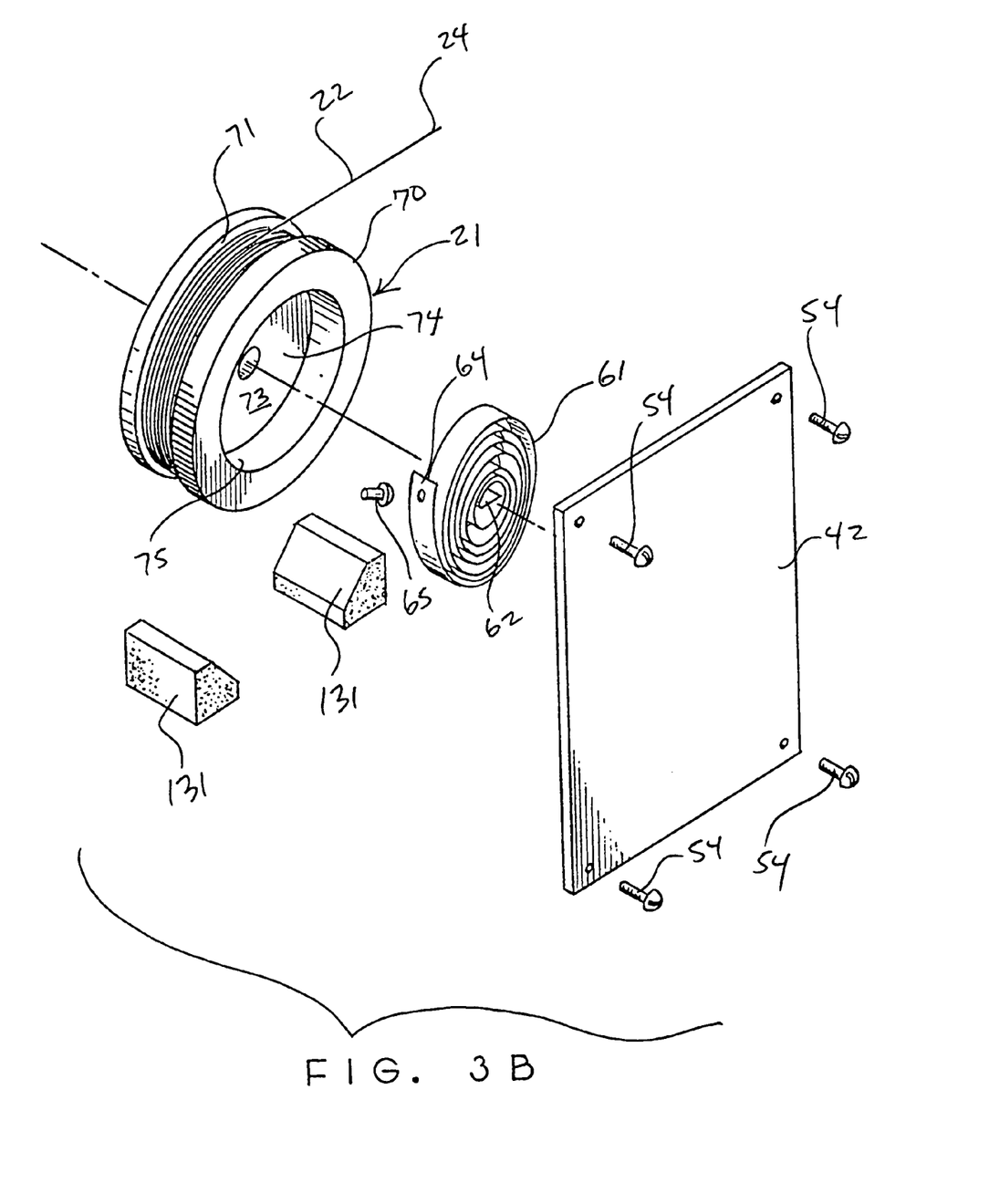

Referring to FIGS. 3A, 3B, 5, and 6, measuring device 10 includes a housing 20, a spool 21, a string 22 wound about spool 21, a marker 23 attached to an end 24 of string 22, a support 25 incorporating reference mark 26 (FIGS. 3A,3B) a rocker arm 27 incorporating reference mark 28 (FIGS. 3A,3B), and a brake 29. Referring in relevant part to FIGS. 3A and 3B, Housing 20 consists of a continuous end wall 40, and opposing, parallel covers or side walls 41,42. Continuous end wall 40 is generally rectangular in shape, and includes opposing, parallel, top/upper and bottom/lower end walls 45,46, and opposing, parallel, upstanding front and rear end walls 47,48. End walls 45,46 are coextensive relative to one another, and end walls 47,48 are substantially coextensive relative to one another. End walls 47,48 are somewhat longer than end walls 45,46, and this contributes to the generally rectangular shape of continuous end wall 40. End wall 45 has opposing inner and outer surfaces 45A,45B, end wall 46 has opposing inner and outer surfaces 46A,46B, end wall 47 has opposing inner and outer surfaces 47A,47B, and end wall 48 has opposing inner and outer surfaces 48A,48B. For orientation purposes, it is to be understood that upper and lower end walls 45,46 define opposing upper and lower ends of housing 20, respectively, and will be referred to as such in this specification, from time to time, and that front and rear end walls 47,48 define opposing front and rear ends of housing 20, respectively, and will also be referred to as such in this specification, from time to time.

Continuous end wall 40 can be integrally formed or fashioned as an assembly of two or more parts, and has opposing sides 50,51. Side 50 is considered a right side of housing 20, which is defined by the right side marginal edges of walls 45–48, and side 51 is considered a left side of housing 20, which is defined by the left side marginal edges of walls 45–48. Sidewall 41 is attached to the right side of housing 20, such as with adhesive, screws, welding, or the like. Sidewall 42 is attached to the left side of housing 20, such as with adhesive, screws 54 as shown in FIG. 3B, welding, or the like. The inner surfaces of continuous end wall 40 and side walls 41,42 cooperate to define an internal chamber 55, in which is housed spool 21, and string 22 wound thereabout, and brake 29, among other things. Preferably, sidewall 42 is attached with screws 54, or the like, for permitting it to be removed for maintenance and replacement of components in housing 20, and subsequently reattached. Housing 20 is fashioned of plastic, wood, metal, or other substantially rigid material or combination of materials.

Spool 21 is fashioned of plastic, wood, metal, or other substantially rigid material or combination of materials, and can be integrally formed or fashioned as an assembly of two or more parts. Spool 21 is mounted in housing 20, namely, in chamber 55, for rotation in clockwise and counterclockwise directions when looking at spool 21 from the left side of housing 20. Looking momentarily to FIGS. 4 and 6, the clockwise rotational direction of spool 21 is indicated by the arcuate arrowed line A, and the counterclockwise rotational direction of spool 21 is indicated by the arcuate arrowed line B. With continuing reference in relevant part to FIGS. 3A and 3B, string 22 is wound about spool 21, string 22 winding onto and relative to spool 21 upon counterclockwise rotation thereof, and winding therefrom and relative to spool 21 upon clockwise rotation thereof. Spool 21 is biased to rotate counterclockwise, winding string 22 thereon. It is to be understood that the term "in housing" as used in this disclosure is intended to mean in chamber 55, and that the term "in housing" and "in chamber 55" are interchangeable terms.

Figure 5:
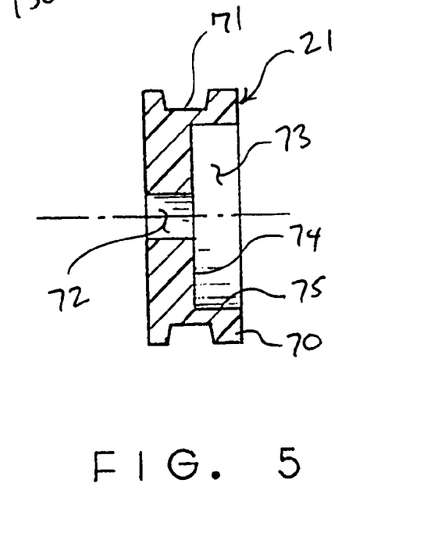
FIG. 5 is a central, side sectional view of the spool depicted in FIG. 4.

Spool 21 consists of an annular body 70 having an inwardly directed, outer circumferential recess/groove 71 into which string 22 is wound. String 22 is wound about spool 21 in a clockwise direction when looking at spool 21 from the left side of housing 20. An end 24 of string 22 extends rearwardly of spool 21 from the upper end of spool adjacent the upper end of housing 20, and outwardly through an opening 56 in end wall 48, which is located toward, and just below or otherwise just inboard of, the upper end of housing 20. End 24 of string is affixed to marker 23, which is located outside of, or otherwise outboard of, housing 20. As seen in FIG. 5, which is a vertical, side sectional view of spool 21, a central bore 72 extends through annular body 70, and leads to a hollow chamber 73, which is actually a counterbore of annular body 70 as defined by an inner end wall 74 and inwardly directed, annular side wall 75. Spool 21 is mounted for rotation with a pin 63 attached to housing 20. Pin 63 is located at the axis of rotation X (FIG. 3A) of spool 21, has a proximal end 63A secured to sidewall 41, and projects into chamber 55 through bore 72 terminating in hollow chamber 73 with a bifurcated distal end 63B.

Figure 4:
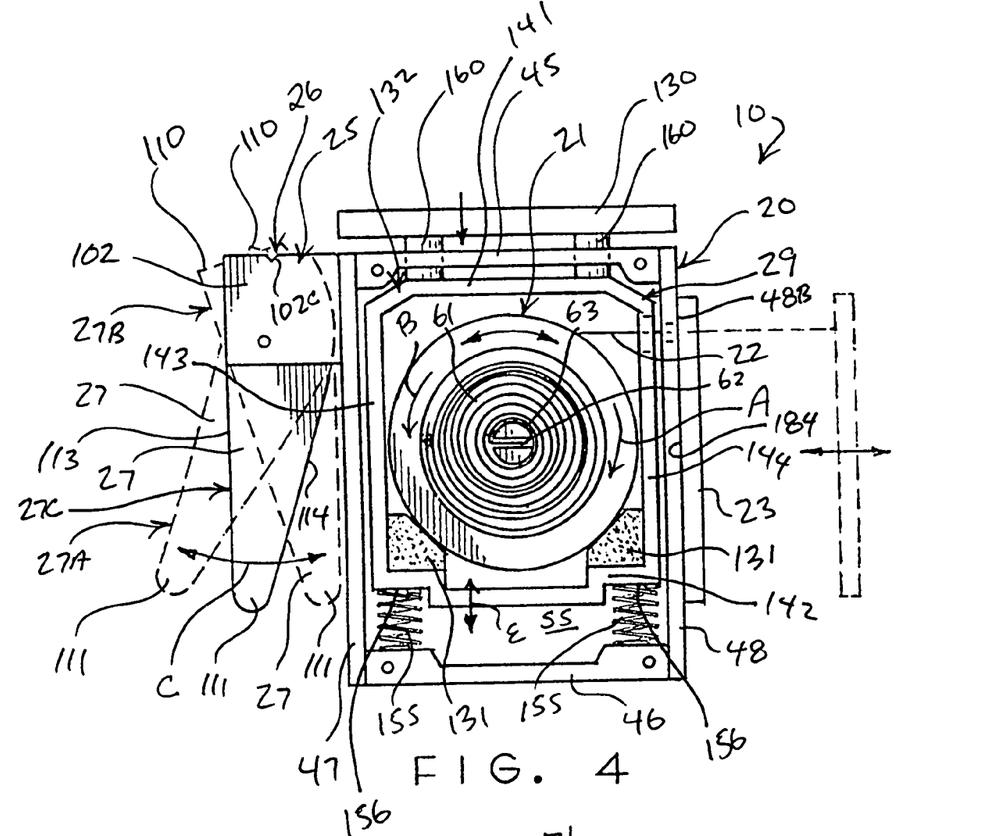
FIG. 4 is a side elevational view of the measuring device of FIG. 1 shown as it would appear with a cover thereof removed showing an internally mounted spool and a brake engaging the spool.
Figure 6:
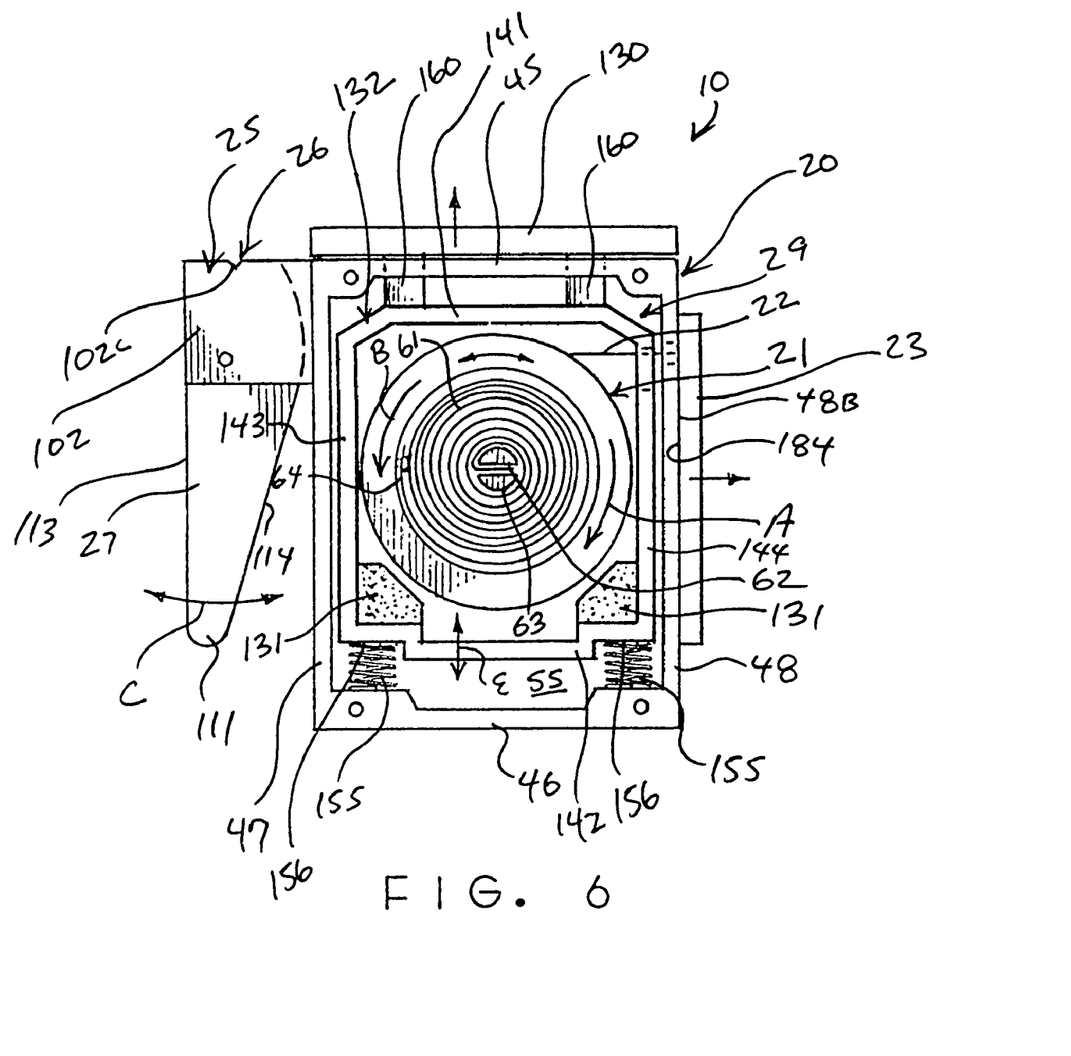
FIG. 6 is a view very similar to the view of FIG. 1 showing the brake as it would appear disengaged from the spool.

A coiled spring 61, fashioned of spring steel or the like, is positioned in hollow chamber 73 and acts on spool 21 biasing it for counterclockwise rotation. Coiled spring 61 has an inner end 62 secured to pin 63, and an outer end 64 secured to spool 21. In this specific embodiment, bifurcated distal end 63B accepts and holds inner end 62 of spring 61, and outer end 64 of spring 61 is secured to side wall 75 with a rivet 65. Coiled spring 61 is coiled outwardly from inner end 62 to outer end 64 in a clockwise direction when looking at measuring device 10 from its left side, as seen in FIGS. 4 and 6. Coiled spring 61 wants to uncoil in a counterclockwise direction, which thus serves to apply the described counterclockwise bias to spool 21.

Rocker arm 27 is positioned forwardly of, or otherwise outboard of, the front end of housing 20, namely, end wall 47. Rocker arm 27 is pivotally attached to a support 100 rigidly affixed to housing 20. Support 100 projects forwardly away from the front end of housing 20. Rocker arm 27 is hung from support 100, and depends downwardly therefrom. In the preferred embodiment disclosed herein, support 100 is attached to end wall 47 adjacent the top or upper end of housing 20, namely, end wall 45. Support 100 can be attached to housing at another location so as to project forwardly and away from the front end of housing 20 as herein described. Support 100 is a bracket that, in this specific embodiment, consists of opposing, spaced-apart parallel lugs 101,102. Lugs 101,102 are substantially coextensive relative to one another. Lug 101 has opposing upper and lower surfaces 101A,101B, and lug 102 has opposing upper and lower surfaces 102A,102B. Lug 101 is located toward the right side of housing 20, and lug 102 is located toward the left side of housing 20. Reference mark 26 consists of a pair of aligned, opposing notches 101C,102C formed into upper surfaces 101A,102A, respectively. Although reference mark 26 consists of two notches 101C, 102C, only one can be used, if desired, whether with lug 101 or lug 102. Reference mark 26 can take on other forms, if desired, such as one or more applied marks, one or more raised marks, etc.

Rocker arm 27 is elongate and generally flat, and has opposing upper and lower ends 110,111, and opposing forward and rearward edges 113,114, respectively. Reference mark 28 consists of a notch 112 formed into upper end 110, and it can take on other forms, if desired, such as an applied mark, a raised mark, etc. Rocker arm 27 has an attachment point 115. Rocker arm 27 is positioned between lugs 101,102, and is attached to lugs 101,102 for pivotal movement at attachment point 115 with a pivot pin 116. Attachment point 115 is located between upper and lower ends 110,111. More particularly, attachment point 115 is located at a forward location of rocker arm 27 toward forward edge 113 adjacent to upper end 110. In other words, the length of rocker arm 27 as measured between attachment point 115 and upper end 110 is less than the length of rocker arm 27 as measured from attachment point 115 to lower end 110 of rocker arm 27. The ends of pivot pin 116 are secured to, and supported by, lugs 101,102, respectively, and the length of pivot pin 116 passing through the space between lugs 101,102 extends into and through a through hole or bore 117 formed through rocker arm 27 at attachment point 115. Although two lugs are used in the preferred embodiment, only one can be employed if desired. Also, support 100 can take on other forms suitable for attaching pivot pin 116 thereto.

Referring to FIG. 4, rocker arm 27 pivots (i.e., swings) at pivot pin 116 as indicated by the arcuate double-arrowed line C in FIGS. 4 and 6 between a first position, a second position, and a third position between the first and second positions. In FIG. 4, the first position of rocker arm 27 is denoted in dotted outline at 27A, the second position of rocker arm 27 is denoted in dotted outline at 27B, and the third position of rocker arm 27 is denoted in solid outline at 27C. In the third position of rocker arm 27 denoted at 27C, upper end 110 of rocker arm 27 is substantially flush with upper surfaces 101A,102A of lugs 101,102, respectively, and reference mark 28 (notch 112) is aligned with reference mark 26 (notches 101C,102C), as seen in FIG. 2. In the first position of rocker arm 27 denoted at 27A in FIG. 4, lower end 111 is directed away from front end of housing 20, and upper end 110 is directed toward the front end of housing 20 disposing reference mark 28 inboard of, and thus misaligned relative to, reference mark 26. In the second position of rocker arm 27 denoted at 27B in FIG. 4, lower end 111 is directed toward front end of housing 20, and upper end 110 is directed away from front end of housing 20 disposing reference mark 28 outboard of, and thus misaligned relative to, reference mark 26.

In accordance with its intended use, measuring device 10 is placed onto a flat, horizontal surface in an upright position with the lower end of measuring device 10 directed against the surface and the upper end of measuring device 10 directly upwardly and upright therefrom. This placement of measuring device 10 is shown in FIGS. 1A and 1B. In this position, the previously-described location of attachment point 115 of rocker arm 27 causes rocker arm 27 to assume its first position 27A as denoted in FIG. 4, in which case rocker arm 27 is biased in its first position. By applying pressure against forward edge 113 of rocker arm 27 at any a point between lower end 111 and attachment point 115, the natural bias imparted to rocker arm 27 can be overcome and rocker arm 27 pivoted from its first position into its second position and, more importantly, into its third position aligning reference mark 28 with reference mark 26. Reference marks 26,28 can be located at other positions on support 100 and rocker arm 27, respectively, so as to be misaligned in the first and second positions of rocker arm 27, and aligned in the third position of rocker arm 27.

Referring to FIGS. 3A, 3B, 5, and 6, brake 29 is positioned in housing 20, and is movable therein toward and against spool 21 (FIG. 5) inhibiting its rotation, and away from spool 21 (FIG. 6) permitting its rotation. Brake 29 is biased for movement toward and against spool 21, and a handle 130, which is located outboard of the upper end of housing 20, namely, end wall 45, is operatively coupled to brake 29 and used to operate brake 29. Handle 130 can be considered part of brake 29, if desired.

Brake 29 includes brake pads 131 attached to a fixture 132. Fixture 132 is free to reciprocate in housing 20 as indicated by the double arrowed line E in FIGS. 4 and 6 between a first position toward upper end of housing disposing brake pads 131 against spool 21 (FIG. 5) inhibiting it from rotating, and a second position toward lower end of housing 20 disengaging brake pads 131 from spool 21 permitting its rotation. Fixture 132 is the support structure for pads 131, and connects handle 130 to pads 131. Fixture 132 can take on many forms for carrying out this function. Nevertheless, in this specific embodiment fixture 132 consists of a continuous sidewall 140 encircling/surrounding the outer perimeter of spool 21. Continuous sidewall 140 is generally square in shape, and has opposing top/upper and bottom/lower extremities 141,142, and opposing front and rear extremities 143,144. Upper extremity 141 is disposed between spool 21 and end wall 45, lower extremity 142 is disposed between spool 21 and end wall 46, front extremity 143 is disposed between spool 21 and end wall 47, and rear extremity 144 is disposed between spool 211 and end wall 48.

Continuous sidewall 140 has an outer surface 150 directed away from spool 21 and toward the inner surface of continuous end wall 40, and an inner surface 151 facing spool 21. Brake pads 131 are fashioned of rubber or other form of elastomeric material or combination of materials, and are attached, such as with adhesive, to inner surface 151 at lower extremity 144, thus facing spool 21. Pads 131 are spaced-apart from one another, and each define brake points. One pad 131 is located where lower extremity 142 meets front extremity 143, and the other pad 131 is located where lower extremity 142 meets rear extremity 144. Although two brake pads 131 are employed in the preferred embodiment disclosed herein, less or more can be used.

Opposing, spaced-apart compression springs 155 are positioned in housing 20, and are captured between outer surface 150 of fixture 132 and lower end of housing 20, namely, end wall 46. Compression springs 155 are conventional, and exert a force against fixture 132 pushing it and biasing it upwardly engaging brakes 132 against spool 21 for inhibiting it from rotating. Outer surface 150 of lower extremity 142 is formed with opposing, inward recesses 156, into which ends springs 155 project, respectively, which helps retain springs 155 in place. Pins, projections, protuberances or the like can also be employed, if desired, for helping to hold springs 155 in place.

Two springs 155 are employed for imparting the described bias to fixture 132 in the preferred embodiment disclosed herein, and less or more can be used, if desired. Other spring forms capable of imparting the described bias to fixture can be used without departing from the invention, including one or more rubber or elastomeric springs, and the like. Also, the bias applied to fixture 132 is a pushing force. A pulling force can be used, if desired, whether in addition to or in lieu of a pushing force. In this aspect, it is to be understood that inwardly-biased springs can be disposed in housing 20 between, and attached to, upper extremity 141 and upper end of housing 20, namely, end wall 45, for providing a pulling force to fixture 132 pulling it upwardly engaging brake pads 131 to spool 21.

Handle 130 is operatively coupled to fixture 132 with opposing, spaced-apart connecting pins 160 extending through openings 161 (FIG. 3A) through the upper end of housing 20, namely, end wall 45. The ends of pins 160 are rigidly coupled to handle 130 and upper extremity 141 of fixture 132. Although two pins 160 are shown operative coupling handle 130 to fixture 132, less or more can be used.

As see in FIG. 3A, the upper end of the housing has a length as defined by end wall 45 extending from the front end of housing 20, namely, end wall 47, to the rear end of housing 20, namely, end wall 48. Handle 130 also has a length, which is substantially equal to the length of the upper end of housing 20. The upper end of the housing also has a width as defined by end wall 45 extending from the right side of housing 20 to the left side of housing 20. Handle 130 also has a width, which is substantially equal to the width of the upper end of housing 20. The described length and width of handle 130 allow it to be easily acted upon by hand.

Marker 23 is fashioned of plastic, wood, metal, or other substantially rigid material or combination of materials, and is preferably integrally formed, although it can be fashioned as an assembly of two or more attached parts, if desired. Marker 23 is a generally flat, elongate element having an upper end 180, an opposing lower end 181, opposing right and left sides 182,183, a flat inner face 184, and an opposing outer face 185. Upper end 180 of marker 23 is enlarged relative its lower end 181, which is tapered. Sides 182,183 taper inwardly toward one another from upper end 180 to lower end 181. End 24 of string 22 extends into and through flat inner face 184 at a central location between sides 182,183 at upper end 180. End 24 is embedded in marker 23, and it can be affixed to marker 23 in other ways in accordance with the skill attributed to the skilled artisan. Because inner face 184 of marker 23 is flat and because end 24 of string projects into and through inner face 184 at a generally intermediate position between sides 182,183 adjacent upper end 180, inner face 184 of marker 23 is drawn flat against outer surface 48B between the upper and lower ends of housing 20 when string 22 is fully wound onto spool, as seen in FIG. 6. This defines a retracted or stored position of marker 23.

Having described the structure of measuring device 10 and the basic function of its structural components, its intended use for measuring the distance between a ball on a flat, horizontal surface and a distant target will now be described, in detail. Looking to FIGS. 1A and 1B, there is seen a distance D between ball 11 resting on a flat surface 12 and target 13. In use, measuring device 10 is taken up, such as by hand, and placed onto surface 12 in an upright position with lower end of measuring device 10 directed against surface 12, upper end of measuring device 10 directly upwardly and upright therefrom disposing rocker 27 in its first position, rocker arm 27 directed toward ball 11, and the rear end of housing 20, namely, end wall 48, directed toward target 13, as illustrated.

Use of measuring device 10 begins when string 22 is fully wound upon spool placing marker 23 in its stored position and brake 29 biased against spool 21 inhibiting its rotation, as shown in FIG. 4. At this point, measuring device 10 is moved forwardly toward ball 11 presenting forward edge 113, between attachment point 115 and lower end 111 of rocker arm 27, against ball 11. Forward movement of measuring device 10 is continued to overcome the bias to rocker arm 27 pivoting it until it reaches its third position aligning mark 28 with mark 26 as seen in FIG. 2. In its third position, forward edge 113 of rocker arm 27 is perpendicular to surface 12. At this point, a compressive downward force is applied against handle 130 that is sufficient to overcome the bias applied to fixture 132, disengaging brake 29 from spool 21 thus permitting its rotation, as shown in FIG. 6. The compressive force applied to handle 130 services to hold measuring device 10 in place. Marker 23 is taken up, such as by hand, and pulled outwardly away from rear end of housing 20 toward reference mark 13 with a force sufficient to overcome the bias applied to spool 21 causing it to rotate unwinding string 22 from spool. Marker 23 is moved to, and positioned at, target 13, at which point handle 130 is released, in which the bias applied to brake 29 moves it back into engagement with spool 21, inhibiting its rotation, locking spool 21 in place in which measurement D is taken as defined from forward edge 113 to marker 23. Leaving spool 21 in this locked position, measuring device 10 can then be utilized in connection with another ball on surface, in which case the difference in the distances of the balls from target 13 can be readily determined.

Preferably, marker is positioned upright, with lower end 111 directed at target 13. If the target were a ball, outer face 185 could be directed against the ball for taking the measurement.

Taking into account the length of measuring device 10 from forward edge 113 of rocker arm 27 in its second position to the rear end of measuring device 10, string 22 can be fashioned with measurement markings, such as metric and/or English measurement markings, for denoting the distance measured between forward edge 113 of rocker arm 27 when disposed in its second position and marker 23. The distances between other balls on surface 12 and target 13 are similarly measured, in which the measurements are compared for determine the ball closest to target 13, or furthest from target 13.

The present invention is described above with reference to a preferred embodiment. However, those skilled in the art will recognize that changes and modifications may be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof.

The invention claimed is:

1. In a device for measuring a distance between a ball on a flat surface and a target including a housing having opposing upper and lower ends and opposing front and rear ends, a spool mounted in the housing, a string wound about the spool and having an end extending outwardly through a rear end of the housing and winding relative to the spool upon rotation thereof in a first direction and unwinding relative to the spool upon rotation thereof in a second direction, a marker attached to the end of the string, and a brake in the housing movable between a first position against the spool inhibiting its rotation and a second position away from the spool permitting its rotation, improvements therein comprising:
   a support attached to the housing, the support projecting forwardly of the front end of the housing;
   a rocker arm having opposing upper and lower ends;
   a first reference mark carried by the support;
   a second reference mark carried by the rocker arm;
   the rocker arm attached at an attachment point thereof to the support for pivotal movement between a first position of the lower end away from the front end of the housing and a second position of the lower end toward the front end of the housing aligning the second reference mark with the first reference mark; and
   the attachment point of the rocker arm positioned relative to the rocker arm biasing the rocker arm in the first position of the lower end of the rocker arm.

2. The improvements according to claim 1, further comprising: the spool including a hollow chamber;
   a coiled spring in the hollow chamber biasing the spool for rotation in its first direction, the coiled spring having an inner end secured to a pin mounted in the housing, and an outer end secured to the spool.

3. The improvements according to claim 2, wherein the pin is located at an axis of rotation of the spool, and the spool is attached for rotation to the pin.

4. The improvements according to claim 1, the brake comprising:
   a continuous sidewall encircling the spool, the sidewall having an upper extremity adjacent the upper end of the housing and a lower extremity adjacent the lower end of the housing;
   at least one brake pad carried by the lower extremity of the continuous sidewall facing the spool;
   the continuous sidewall movable in the housing between the first position of the brake engaging the brake pad against the spool, and the second position of the brake disengaging the brake pad from the spool.

5. The improvements according to claim 4, further comprising at least one spring captured by and between the lower end of the housing and the lower extremity of the continuous sidewall biasing the brake in its first position.

6. The improvements according to claim 1, wherein the marker is generally flat and elongate, and has an upper end, a lower end, opposing sides, a flat inner face, and an opposing outer face.

7. The improvements according to claim 6, wherein the end of the string extends into and through the flat inner face of the marker between the opposing sides thereof.

8. The improvements according to claim 7, further comprising:
   the rear end of the housing having a flat outer surface extending along substantially the entire length of the housing from the upper end to the lower end;
   wherein the flat inner face of the marker is drawn flat against the flat outer surface of the rear end of the housing when the string is fully wound onto the spool.

9. In a device for measuring a distance between a ball on a flat surface and a target including a housing having opposing upper and lower ends and opposing front and rear ends, a spool mounted in the housing, a string wound about the spool and having an end extending outwardly through a rear end of the housing and winding relative to the spool upon rotation thereof in a first direction and unwinding relative to the spool upon rotation thereof in a second direction, a marker attached to the end of the string, and a rocker attached to the housing and disposed forwardly of the front end of the housing, improvements therein comprising, improvements therein comprising:
   a continuous sidewall encircling the spool and having an upper extremity adjacent the upper end of the housing and a lower extremity adjacent the lower end of the housing;
   at least one brake pad carried by the lower extremity of the continuous sidewall facing the spool; and
   the continuous sidewall movable between a first position engaging the brake pad against the spool inhibiting its rotation, and a second position disengaging the brake pad from the spool permitting its rotation.

10. The improvements according to claim 9, further comprising at least one spring captured by and between the lower end of the housing and the lower extremity of the continuous sidewall biasing the continuous sidewall in its first position.

11. The improvements according to claim 9, further comprising:
   the spool including a hollow chamber;
   a coiled spring in the hollow chamber biasing the spool for rotation in its first direction, the coiled spring having an inner end secured to a pin mounted in the housing, and an outer end secured to the spool.

12. The improvements according to claim 11, wherein the pin is located at an axis of rotation of the spool, and the spool is attached for rotation to the pin.

13. The improvements according to claim 9, wherein the marker is generally flat and elongate, and has an upper end, a lower end, opposing sides, a flat inner face, and an opposing outer face.

14. The improvements according to claim 13, wherein the end of the string extends into and through the flat inner face of the marker between the opposing sides thereof.

15. The improvements according to claim 14, further comprising:
   the rear end of the housing having a flat outer surface extending along substantially the entire length of the housing from the upper end to the lower end;
   wherein the flat inner face of the marker is drawn flat gainst the flat outer surface of the rear end of the housing when the string is fully wound onto the spool.

* * * * *